（12）United States Patent
Rusch

(10) Patent No.: US 6,338,619 B1
(45) Date of Patent: *Jan. 15, 2002

(54) FIXTURE FOR WINDOW REPAIR

(75) Inventor: Bradd R. Rusch, Clinton, WI (US)

(73) Assignee: Auto Glass Specialists, Inc., Madison, WI (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/153,698

(22) Filed: Sep. 15, 1998

(51) Int. Cl.[7] ................................................ B29C 31/04
(52) U.S. Cl. ............................. 425/11; 425/12; 425/13; 156/94; 264/36.1
(58) Field of Search ............................ 425/11, 12, 13; 156/94; 427/140; 264/36.1

(56) References Cited

U.S. PATENT DOCUMENTS

| | | |
|---|---|---|
| 4,249,869 A | 2/1981 | Peterson |
| 4,385,879 A | 5/1983 | Wilkinson |
| 4,814,185 A | 3/1989 | Jones |
| 4,921,411 A * | 5/1990 | Ottenheimer ................. 425/12 |
| 5,116,441 A | 5/1992 | Campfield, Jr. |
| 5,328,649 A | 7/1994 | Newsome |
| 5,565,217 A * | 10/1996 | Beckert et al. ................ 425/12 |
| 5,589,018 A | 12/1996 | Campfield |
| 5,614,046 A | 3/1997 | Campfield |
| 5,622,726 A * | 4/1997 | Tanner ......................... 425/12 |
| 5,670,180 A | 9/1997 | Mackey et al. |
| 5,776,506 A * | 7/1998 | Thomas et al. ................ 425/12 |

OTHER PUBLICATIONS

International Search Report (Form PCT/ISA/210—second sheet) received Dec. 21, 1999.
PCT/IPEA/408, Written Opinion received Jul. 19, 2000, 6 pgs.
AEGIS®, Instruction Manual—AEGIS Windshield Repair®, Jun. 1993.
AEGIS®, AEGIS® Windshield Repair Product Catalog, 1998.

* cited by examiner

*Primary Examiner*—Nam Nguyen
*Assistant Examiner*—Joseph S Del Sole
(74) *Attorney, Agent, or Firm*—Lathrop & Clark LLP

(57) ABSTRACT

There is disclosed a glass repair fixture including a mount, a leg, and a chamber, such that the leg is rotatable around the mount that decreases set up time and manufacturing cost, and improves a resulting glass repair.

13 Claims, 2 Drawing Sheets

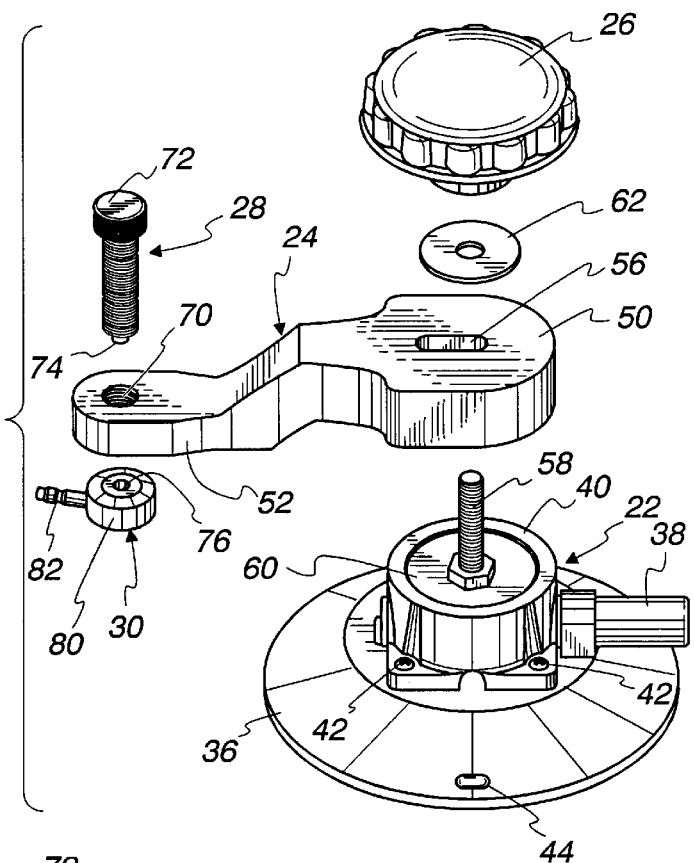
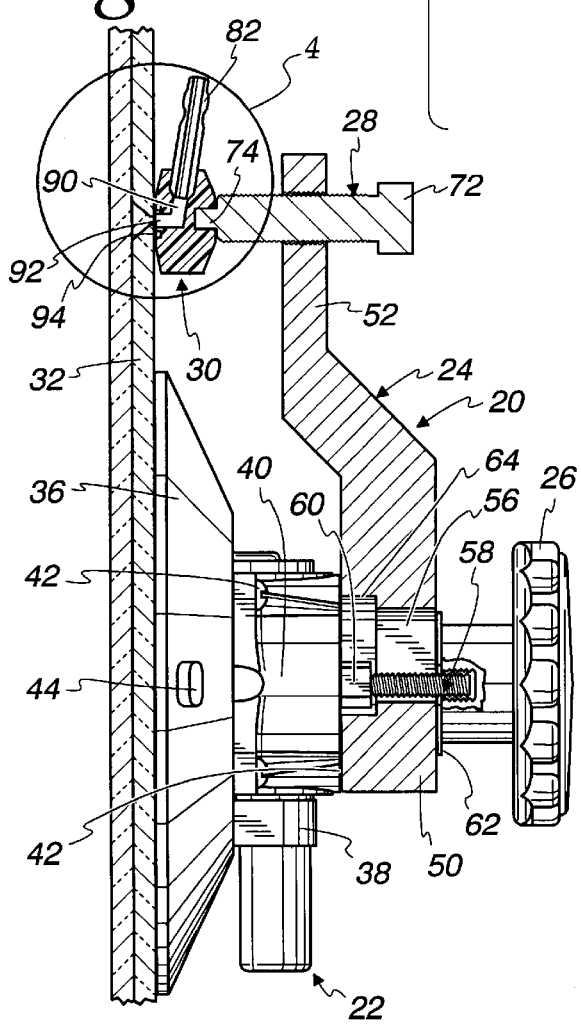
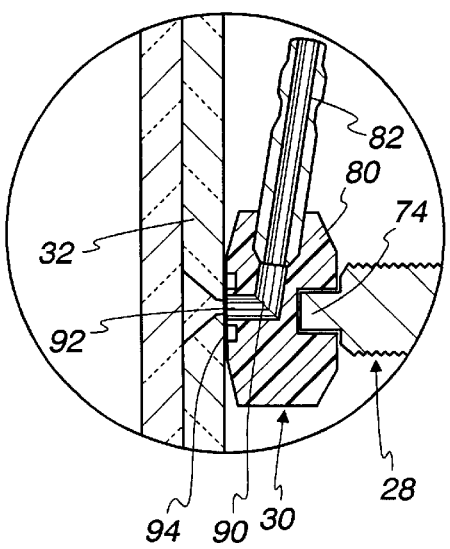

FIXTURE FOR WINDOW REPAIR

FIELD AND BACKGROUND OF THE INVENTION

The present invention relates generally to window repair fixtures and specifically to repair fixtures for use on vertically oriented glass panes that maintain a pressurized liquefied glass repair material in close contact with a damaged portion of the glass during the repair operation.

Generally, small repairs on glass can be made using a liquefied glass repair material, such as a polymer or resin, that is brought into and maintained in close contact with the damaged glass until the glass repair material is cured and relatively transparent or translucent such that the repair is not readily apparent. To maintain the glass repair material in close contact with the glass, the material is applied under pressure from a pump. To deliver the pressurized fluid material and ensure that it remains in the damaged portion of the glass, a variety of repair fixtures have been employed.

One prior glass repair fixture, sold as model FIX 2000 by Aegis Windshield Repair, Division of Autoglass Specialists, Inc., Madison, Wis., includes a suction cup mount, a yoke and leg combination that rotates and pivots relative to the mount, and a chamber joined to a distal end of the leg to engage the glass, receive the glass repair material and maintain the glass repair material in place until it is sufficiently dried or "cured." The suction cup mount is similar to those used to carrier large panes of glass or wind shields. It includes a rubber cup and a vacuum pump for evacuating air from under the cup to create a suction great enough to ensure a solid mount of the fixture on the glass to be repaired.

The mount need only be placed near a break in the glass. To accurately place the chamber over the damaged portion, the yoke and leg combination rotates around a screw in the mount. To lock the yoke, a top knob on the screw is rotated to provide a clamping pressure against the mount.

The prior art yoke is slotted for movement toward and away from the mount, and it has a forked distal end through which a laterally extending side screw extends. The side screw joins the leg to the yoke by extending through a slot in the leg so that the leg can be adjusted toward and away from both the yoke and the glass. A side knob locks the leg at a desired position by clamping the forked ends of the yoke on to both sides of the leg.

The leg is shaped to angle toward the glass and it terminates at a foot that is intended to be parallel to the glass during repairs. The foot is threaded to receive a chamber. The chamber then can be adjusted normal to the glass by rotating the entire chamber.

A disadvantage of this design is that repeated adjustments of the top and side knobs may be necessary to bring the foot parallel to the glass. Any deviation from parallel, and the chamber seal can fail allowing polymeric material to drain out. Further, with the chamber threaded directly to the leg, the chamber nipple is not always maintained upright to prevent drainage of the liquefied glass repair material particularly when the glass is vertical.

A partial solution was accomplished with the use of a chamber (part no. KIT 1040, Aegis Windshield Repair, Division of Autoglass Specialists, Inc. Madison, Wis.) that was not threaded directly to the leg. Instead, the fixture uses a bolt threaded to a distal end of the leg and the chamber is freely rotatably mounted on an unthreaded end of the bolt. This arrangement permits the chamber to be rotated to keep the nipple upright and prevent drainage once the bolt has set the chamber at the proper position relative to the glass.

To eliminate the need for the leg foot to be adjusted precisely parallel to the glass being repaired, the chamber adjustment screw and leg are joined via an offset bushing that permits less precision in setting the leg foot (part no. FIX 2015, Aegis Windshield Repair, Division of Autoglass Specialists, Inc., Madison, Wis.). Even this arrangement is unsatisfactory because the offset bushing does not provide the degree of accuracy necessary to ensure proper chamber placement and reliable seal against the glass. Further, the leg and offset bushing are expensive to make.

Thomas et al., U.S. Pat. No. 5,776,506, discloses a suction cup mounted fixture with a single leg for mounting an injector. Three feet extend downwardly from the fixture toward the glass, extending past the suction cup, so that the cup is spaced from the glass. Turning a lever lowers the cup for engagement to the glass. The feet allow the fixture to be slid along the length of a crack in the windshield without raising the injector from the glass, but the fixture would be impractical for use on vertical glass because its chamber is not configured to rotate to prevent fluid polymer from draining.

Jones, U.S. Pat. No. 4,814,185, discloses a suction cup mounted fixture having an injector secured to one end of a rigid base and two adjustment screws secured to the other end of the base. This is a cumbersome arrangement that requires turning the rear adjustment screws to pivot the base around the cup to press the injector against the glass.

Newsome, U.S. Pat. No. 5,328,649, discloses a bar type repair fixture having a resin injection chamber on one end, and a positioning screw on the other end, with a suction cup between. No rotatable chamber is disclosed for preventing drainage from the chamber.

There is a need for a simple, reliable, and inexpensive fixture to repair glass, such as laminated glass and, in particular, vertically oriented laminated glass.

SUMMARY OF THE INVENTION

To simplify glass repair procedures and reduce the time necessary to set up glass repair fixture prior to repairing glass, there is provided in accordance with the present invention a glass repair fixture having: a mount; a leg having a proximate portion rotatably joined to the mount, and a distal portion; a chamber adjustment mechanism joined to the distal portion of the leg for movement in a direction normal to a glass surface on which the fixture is mounted; and a chamber rotatably mounted on the chamber adjustment mechanism and having a port for receiving glass repair material.

The glass repair fixture mount may include a suction cup and a hand vacuum/pressure pump. The glass repair fixture leg proximate portion may define a slot enabling leg movement toward and away from the mount. The leg may further have a proximate portion fixed relative to the leg distal portion.

The glass repair fixture chamber adjustment mechanism may be a screw or other device that moves the chamber in a direction normal to the surface of the glass. When the chamber adjustment is a screw, the screw can be threaded directly to the distal portion of the leg for fine adjustment and secure sealing of the chamber relative to the glass. Further, such a screw may have an unthreaded tip portion for rotatably engaging the chamber to enable the chamber to be rotated relative to the screw even after the screw has been set so that the port or a nipple for receiving repair material will not drain the chamber when filled with glass repair material.

The invention includes a method of repairing glass including the steps of securing a mount of a repair fixture to a sheet of damaged glass in the vicinity of a damaged area; adjusting a distal portion of a repair fixture leg in a direction normal to the damaged area; releasably securing the distal portion of the repair fixture leg over the damaged area; rotating an adjustment screw through the distal portion of the repair fixture to contact a chamber and chamber gasket over the damaged area; and rotating the chamber relative to the adjustment screw to orient a chamber nipple to prevent drainage of glass repair material from the chamber. The method can further include the step of moving the distal portion of the leg in a direction radial to the mount prior to releasably securing the distal portion of the leg over the damaged area.

BRIEF DESCRIPTION OF THE DRAWINGS

FIG. 2 is an exploded perspective view of a glass repair fixture in accordance with the present invention.

FIG. 3 is a partial cross-sectional view of the fixture taken along line 3—3 in FIG. 1.

FIG. 4 is a detailed view of the fixture circled in FIG. 3.

DETAILED DESCRIPTION OF THE INVENTION

Figure 1:
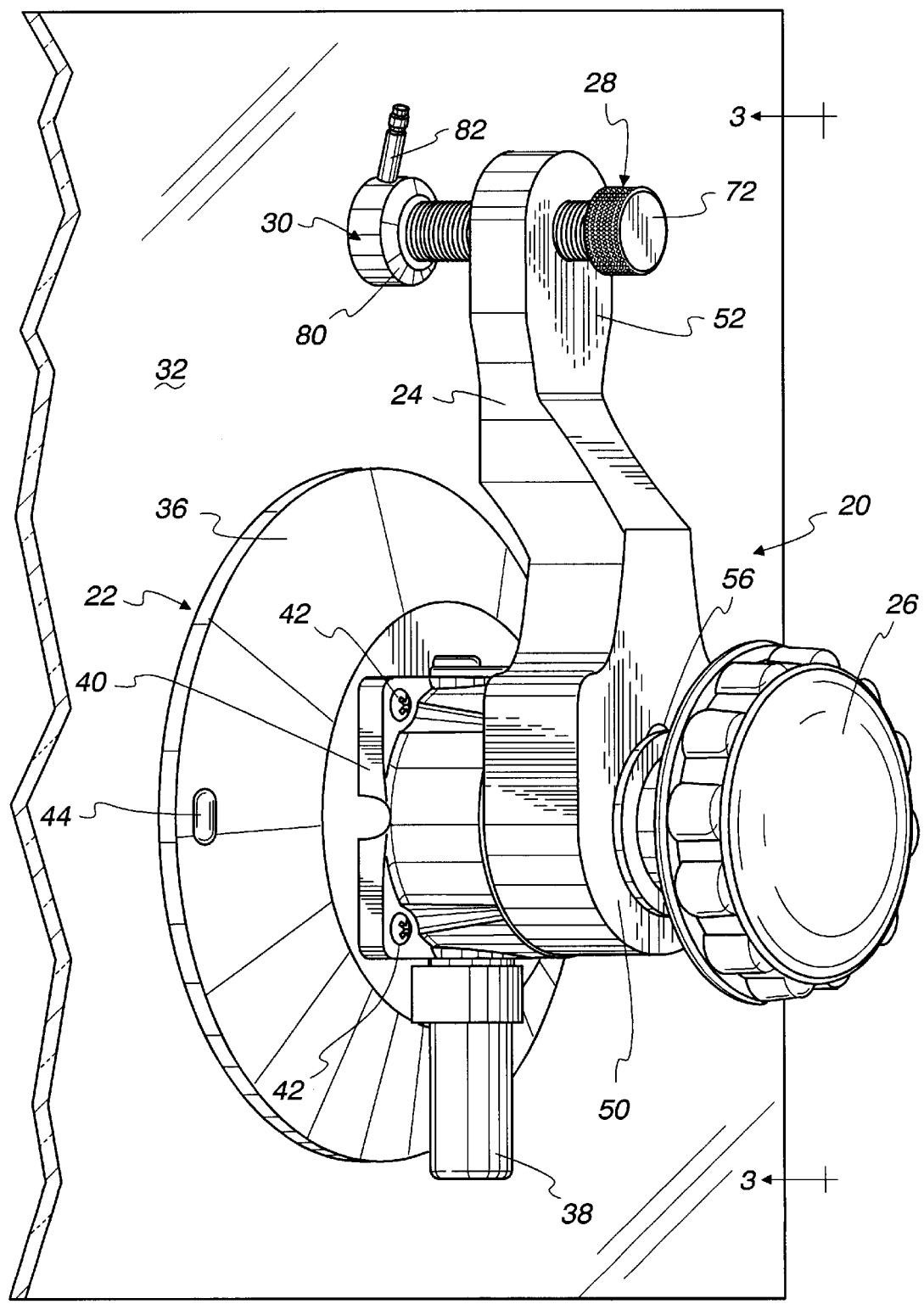
FIG. 1 is a perspective view of a glass repair kit in accordance with the present invention and mounted on a pane of glass to be repaired.

In the following detailed description, the same numerals will be used in each of the figures to identify the same or similar part. Illustrated generally in FIGS. 1 to 3 in a glass repair fixture 20 in accordance with the present invention that is preferably used in conjunction with glass repair kits and methods such as the Aegis Deluxe Kit sold by Aegis Windshield Repair, Division of Autoglass Specialists, Inc., Madison, Wis. The fixture 20 is preferably used to repair vertical laminated glass 32 although it can be used to repair any type of glass having damage commonly described as: bull's eye; half-moon; star break; crack; and combinations thereof. Further, the glass can be at any orientation between horizontal and vertical and be flat, curved, and compound curved.

The fixture 20 includes: a mount 22; a leg 24; a leg knob 26; a chamber positioning screw 28; and a chamber 30. The mount 22, as illustrated, is a conventional suction device having a truncated cone-shaped cup 36, a hand vacuum pump 38, and cast housing 40 joined to the cup 36 with screws 42. The vacuum pump 38 is in fluid communication with the interior of the cup 36 such that pump operation creates a vacuum under the cup 36 when the cup 36 is placed on a pane of glass 32 to mount the fixture 20 securely to the glass 32. To release the mount 22, a tab 44 is pulled up to bend the cup 36 and release the vacuum. The preferred type of mount 22 is available from Woods Power Grip, Laurel, Mont., under part nos. TL6 (cup), TLM 50216 (housing), and 90111 (pump), or from Aegis, Windshield Repair under part no. FIX 4000, but other types of mounts other than suction cups can be used within the scope of the present invention.

The leg 24 is illustrated in a preferred configuration although other configurations are possible which extend from over the housing 40 toward the glass. The key features of the leg 24 are that it have a proximate portion 50 joined to the mount 22 and a distal portion 52 through which chamber positioning screw 28 is oriented for supporting the chamber 30 substantially perpendicular to the glass 32. In the preferred embodiment, the proximate portion 50 includes a slot 56 (FIG. 2) through which a mounting bolt 58 from the mount 22 extends. The mounting bolt 58 is secured to the mount 22 by a nut 60 to prevent bolt rotation relative to the mount 22. On the opposite side of the leg slot 56 there is a washer 62 and the leg knob 26 (preferably part no 3018-B, from Davies Molding Co., Carol Stream, Ill. 60188). The leg knob 26 has female threads matching the bolt 58 so that the knob 26 can be tightened down to secure the leg 24 in a fixed position. With this arrangement it is preferable to include an oversized mortise 64 to accommodate the nut 60. The proximate portion 50 and the distal portion 52 are fixed relative to one another for ease of fixture operation. The preferred embodiment shows this fixed relationship by use of a solid one-piece leg 24, but multi-piece legs can be used in accordance with the present invention so long as the proximate portion 50 and the distal portion 52 are fixed relative to one another. Also preferably, the leg 24 is made of aluminum and is anodized.

As stated, the leg 24 includes a slot 56 that allows the leg 24 to be rotated and moved radially toward and away from the mount 22. The leg 24 can move nearly 360°, but due to its shape will engage the hand vacuum pump 38. Other leg shapes and lengths within the scope of this invention will rotate 360° relative to the mount 22. The combination of rotational and radial movement permits a glass repair technician to secure the mount 22 to the glass 32 at a location in the general vicinity of the damage, then rotate and axially adjust the leg 24 to be positioned over the damage, and then tighten the leg knob 26 to secure the leg 24 in place.

At the distal portion 52 of the leg 24, there is a drilled and tapped hole 70 for receiving the chamber positioning screw 28. The threaded engagement of the two permits fine adjustment of the chamber 30 relative to the glass 32. The chamber positioning screw 28 is preferably finely threaded at twenty threads per inch to enable slight, but critical, adjustment of the chamber 30, and also ensure fluid-tight contact between the chamber 30 and the glass 32.

The chamber positioning screw 28 includes at one end a knurled knob 72 that permits hand-tightening and adjustment. At the opposite end, the chamber positioning screw 28 includes an unthreaded and relatively smooth post 74 that corresponds to a mating recess 76 in the chamber 30. This arrangement is snug yet permits the chamber 30 to be rotated independently of the chamber positioning screw 28 so that the chamber positioning screw 28 is set at an appropriate position relative to the glass 32 and the chamber 30 can be rotated as needed to prevent drainage of liquefied polymeric repair liquid, as described more fully below. This arrangement also permits quick interchange of chambers of different sizes. Preferably, the chamber positioning screw 28 is on half inch in diameter and is made of aluminum to resist corrosion. As is inherent in the operation of a screw, i.e. movement in directions normal to the glass surface, there can be other devices that perform the same function and be within the scope of the present invention.

The chamber 30 includes a main body 80 and a nipple 82. The main body 80 is illustrated as generally cylindrical with chambered glass-side corners for better visibility of the gasket/glass seal, but the body 80 can be any shape. Preferably, the main body 80 is made of Delrin®, but other materials can be used. In addition to the recess 76, the main body 80 defines a port 90 from the nipple 82 to an opening 92 adjacent to the glass 32. The main body 80 also defines an annular recess that receives a gasket 94 that preferably has four annular ridges (such as the "Quad Rings", part nos. SBX 2010, 2016, or 2020 available in a variety of sizes from Aegis Windshield Repairs, Inc.) to ensure an adequate seal between the main body 80 and the glass 32. Once the chamber 30 is positioned properly and the seal is in secure contact with the glass 32, the liquefied glass repair material can be injected and then put under pressure and vacuum through the nipple 82, the port 90, and the opening 92 to repair the glass 32.

The nipple 82 is preferably press-fit into the main body 80, and preferably includes a quick connect/disconnect configuration for coupling to a pump that delivers and pressurizes the liquefied glass repair material. The nipple 82 may extend out of the main body 80 at a slight angle away from the glass 32 to enable easy connection to a pump (not illustrated).

The foregoing detailed description is presented for clearness of understanding only and no unnecessary limitations therefrom should be read into the following claims.

What is claimed is:

1. A glass repair fixture comprising:
   a mount;
   a one-piece leg having a proximate portion rotatably joined to the mount, and a distal portion;
   a chamber adjustment mechanism joined to the distal portion of the one-piece leg for movement only in a direction normal to a glass surface on which the fixture is mounted, wherein the chamber adjustment mechanism comprises a screw with an unthreaded post portion; and
   a chamber rotatably mounted on the unthreaded post portion of the chamber adjustment mechanism screw and having a glass repair material port.

2. The glass repair fixture of claim 1, wherein the mount includes:
   a suction cup joined to the leg; and
   a vacuum pump for drawing at least
   a partial vacuum under the suction cup.

3. The glass repair fixture of claim 1, wherein the leg proximate portion defines a slot enabling leg movement toward and away from the mount.

4. The glass repair fixture of claim 1, wherein the leg proximate portion is fixed relative to the leg distal portion.

5. The glass repair fixture of claim 1, wherein the chamber adjustment mechanism comprises a screw.

6. The glass repair fixture of claim 1, wherein the chamber adjustment mechanism comprises a screw threaded directly to the distal portion of the leg.

7. The glass repair fixture of claim 1, wherein the chamber port includes a nipple fixed to the chamber and rotatable to an upright orientation to reduce drainage of liquefied glass repair material from the chamber.

8. A glass repair fixture comprising:
   a mount;
   a one-piece leg having a proximate portion rotatably joined to the mount, and a distal portion wherein the one-piece leg proximate portion is fixed relative to the one-piece leg distal portion;
   a chamber adjustment mechanism joined to the distal portion of the one-piece leg for movement in a direction normal to a glass surface on which the fixture is mounted, wherein the chamber adjustment mechanism comprises a screw with an unthread post portion; and
   a chamber rotatably mounted on the unthreaded post portion of the chamber adjustment mechanism screw and having a glass repair material port.

9. The glass repair fixture of claim 8, wherein the mount includes:
   a suction cup joined to the leg; and
   a vacuum/pump for drawing at least a
   partial vacuum under the suction cup.

10. The glass repair fixture of claim 8, wherein the leg proximate portion defines a slot enabling leg movement toward and away from the mount.

11. The glass repair fixture of claim 8, wherein the chamber adjustment mechanism comprises a screw.

12. The glass repair fixture of claim 8, wherein the chamber adjustment mechanism comprises a screw threaded directly to the distal portion of the leg.

13. The glass repair fixture of claim 8, wherein the chamber port includes a nipple fixed to the chamber and rotatable to an upright orientation to reduce drainage of liquefied glass repair material from the chamber.

* * * * *